Aug. 25, 1931.  F. W. BAKER  1,820,174
DISK WHEEL
Filed Aug. 25, 1926  2 Sheets-Sheet 2
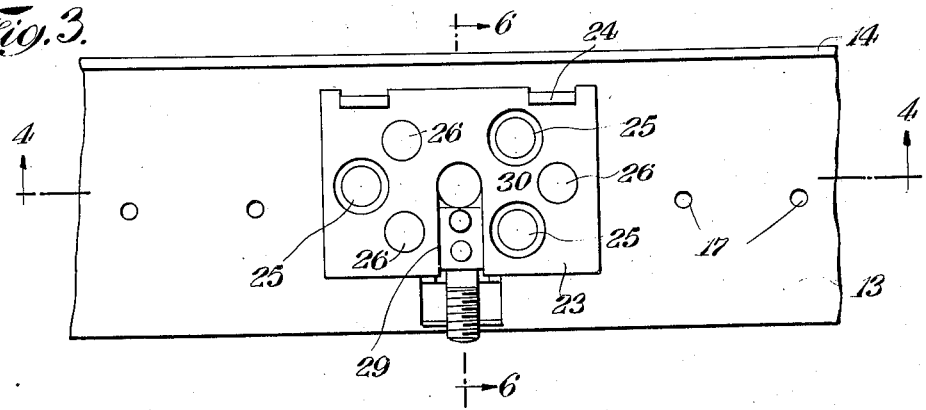
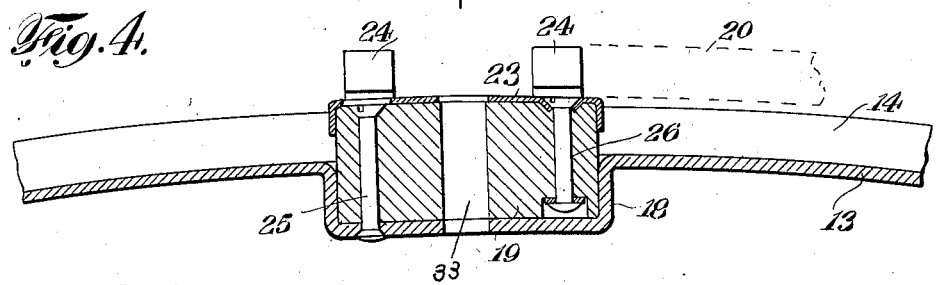
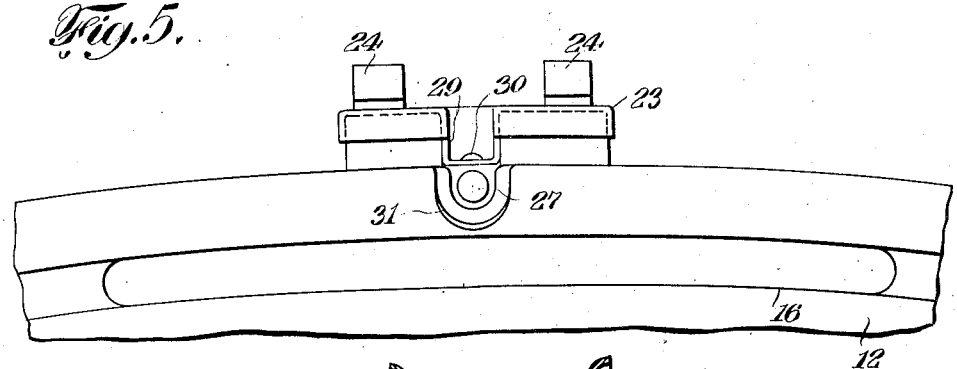
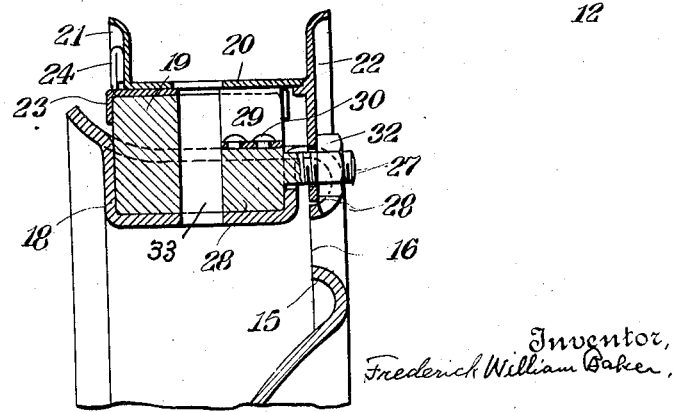
Inventor,
Frederick William Baker.
By his Attorney.
Ramsay Hoguet Patented Aug. 25, 1931

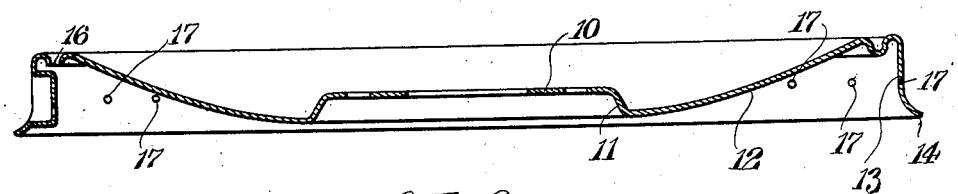
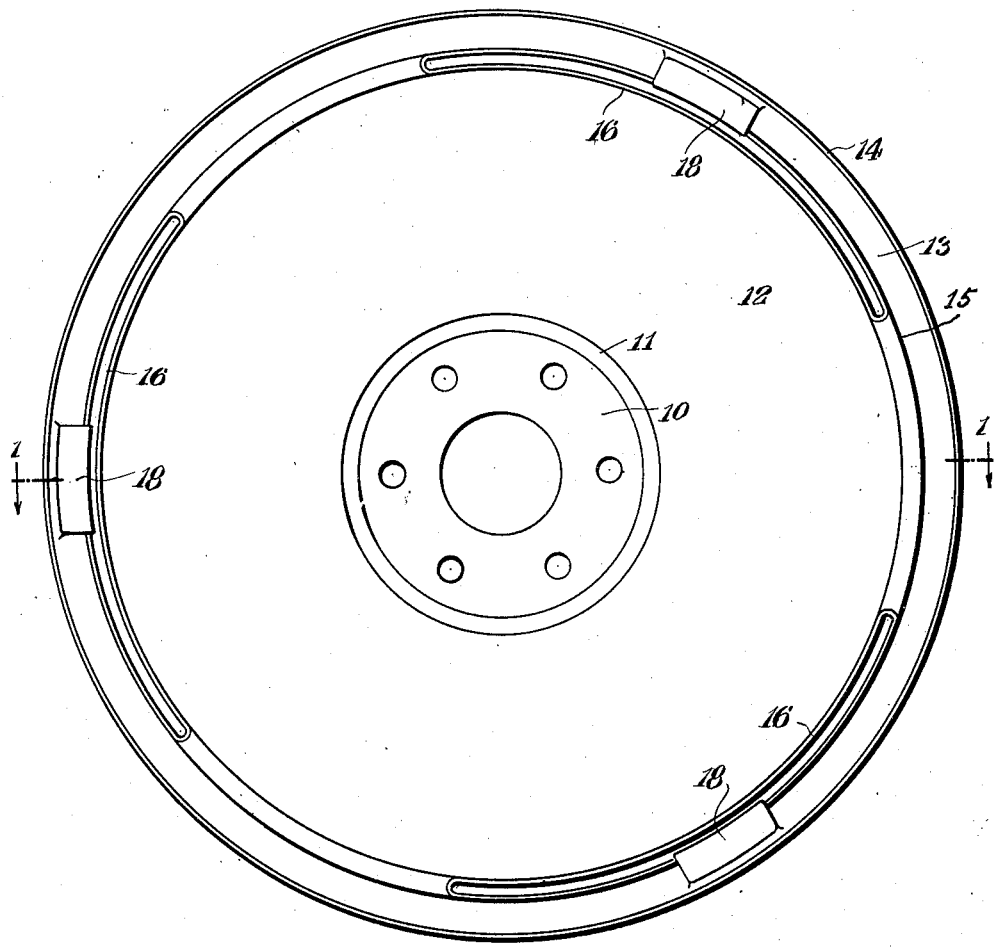

1,820,174

UNITED STATES PATENT OFFICE

FREDERICK WILLIAM BAKER, OF STOURBRIDGE, ENGLAND, ASSIGNOR TO TRINITY WHEEL CORPORATION, OF NEW YORK, N. Y., A CORPORATION OF NEW YORK

DISK WHEEL

Application filed August 25, 1926. Serial No. 131,512.

My invention relates to improvements in disk wheels such as are adapted for use on motor cars or the like in which the disk takes the place of a spoke system. My invention is intended to produce a disk wheel which is simpler, cheaper, stronger and generally better than the disk wheels now in use.

My invention is also intended to produce a wheel of this type in which the disk has a flange preferably peripheral and concentric with the tire bearing rim, and has also the tire bearing rim spaced apart from the disk flange so as to leave a clear air space between the major portions of the flange and disk. The invention also is intended to connect the tire bearing rim with the disk flange at intervals so that the intervals between the connecting portions of the flange and rim will cause the rim to have spring or resilient segments between the said bearing or connecting portions. Thus it will be seen that the tire bearing rim will have a certain resilience confined between the points where it connects to the flange, and the disk and flange are perforated so that air circulation will be provided when the wheel is rotating which will tend to keep the whole wheel structure cool, particularly as the circulation is also between the tire bearing rim and the disk which carries it.

The invention is also intended to produce a strong yet resilient connection between the disk flange and the tire bearing rim arranged to have the torsional drive imparted from the disk to the tire bearing wheel through to the said resilient members, thus preventing excessive shocks and strains when the wheel is rotating to drive the car. The invention is also intended to provide a convenient means for demountably separating the tire bearing rim from the flange of the disk.

The invention is also intended to have the disk weakened radially at the points generally opposite the connecting members between the rim and flange so that the points of maximum rigidity of the rim will come opposite the points of maximum resilience in the disk, and thus the wheel structure as a whole will be somewhat resilient but have the resilience uniformly distributed, although the more resilient points of both disk and wheel are not uniformly distributed.

These and other advantages and facts of the invention will appear more clearly from the description which follows:

Reference is to be had to the accompanying drawings forming a part of this specification in which similar reference characters refer to similar parts throughout the several views.

Figure 1 is a cross section of the disk forming a part of my improved wheel, a section being taken on the line 1—1 of Figure 2.

Figure 2 is an inside elevation of the disk.

Figure 3 is a broken plan view of a part of the disk flange and one of the bearing members arranged between the flange and the tire rim.

Figure 4 is a section on the line 4—4 of Figure 3.

Figure 5 is a broken enlarged view of a part of the disk and the bearing member thereon.

Figure 6 is a cross section on the line 6—6 of Figure 3.

The disk forming a part of my invention is provided with a central hub portion 10 adapted to be connected with the axle hub in any usual or approved way, and this hub portion is flared axially as at 11, and then is oppositely flared as at 12, this body portion 12 merging into a peripheral flange 13, which is generally parallel with the tire bearing rim as hereinafter described and is preferably flared at its terminal edge, as shown at 14, to facilitate its easy attachment to a rim. The disk is also preferably provided with an annular corrugation 15 which is preferably located near the outer part of the disk, and the disk is also preferably weakened at certain radial intervals, preferably symmetrically disposed. This weakening can be done in any approved way, but I prefer to do it by making slots 16 and these can be made to advantage in the corrugation 15. The slots are preferably produced with inturned edges as shown in Figure 1, the edge portions being turned in from the outer face of the disk so that no tearing or cutting edges will be exposed. The flange portion 13 of the rim is also preferably perforated as at 17, and thus when the wheel is rotating a circulation of air will be produced through the slots 16, and perforations 17 this being facilitated because the tire bearing rim 20 is spaced apart from the flange 13. The arrangement for air circulation has a tendency to keep the wheel as a whole cool.

The tire rim 20 is connected with the flange 13 at spaced intervals, and a simple and strong way of making the connection is to provide the flange 13 at desired intervals preferably opposite the slotted or weakened portion 16, with seats 18 which as illustrated are countersunk in the flange, but which can be provided in any other approved way.

The seats 18 receive resilient bearing members 19 which serve to cushion the tire bearing rim 20 and also serve as the driving connection between the disk and the tire bearing rim. These resilient members 19 can be laminated or otherwise, and they can preferably be made of layers of textile fabric, rubberized or otherwise, and each resilient member fits snugly into seat 18.

It is desirable to form a strong connection between each bearing member 19 and flange 13, and also the tire bearing rim 20, but the connection or fastening means must independently secure the bearing member to the flange and rim. The rim 20 is shown as a conventional tire bearing rim having one rigid side flange 21, and one demountable side flange 22, and so far as my invention is concerned the rim can be of any usual or approved type. To provide for a firm connection between the rim and the bearing members 19, each bearing member is preferably covered on the outer side by a cap 23 which has clips 24 to engage one side of the flange 21. Each bearing member is shown attached to the flange 13 by rivets 25, or equivalent fastenings extending through the body of the bearing member and through the through the countersunk parts of the cap 23. carrying the clips 24 is secured by rivets 26, extending through the bearing member and through the countersunk parts of the cap 23. As a means of demountably connecting the rim 20 with the tire bearing members I have shown it provided with clips 28 through which extend the bolts 27, each having a head or block 28 resting in the seat 18, and held against displacement by pins 30 passing through the member 29 which is integral with the cap 23 and is bent downward in a recess of the member 19 so as to bear against the block 28. The bolts 27 have nuts 32 which fit them and which can be turned up against the clips 28 so that by removing the nuts the flange 22 can be pulled off and the rim 20 can then likewise be pulled off the bearing members 19, and hole 33 is left through the seat 18 member 19 and rim 20 and if desired the tire valve stem can run through this hole.

It will be apparent that the rim 20 might be demountable in other ways without affecting the invention.

From the foregoing description it will be noticed that the tire bearing members 18 are arranged opposite the weakened portions of the disk 12, and that the rim 20 supported on these members will have therefore its points of maximum rigidity opposite these members and opposite the weakened portions of the disk, but the spring sectors of the rim, that is the parts between the bearing members will be opposite the more rigid parts of the disk so that as a whole the wheel structure is sufficiently elastic to prevent shocks and strains such as occur in usual rigid wheels, but it is not so elastic as to produce any lost energy in its use or to render its structure unstable. It will be further noted as the driving strain is through the resilient bearing members the objectionable rigidity of the usual wheel is further lessened.

I claim:

1. A disk wheel having a disk terminating in a peripheral flange concentric with the wheel tread, the disk being circumferentially channelled adjacent to the flange to provide an air inlet to the inner side of said flange, a tire carrying rim supported spaced about the flange, said flange being peripherally perforated to admit the air from said channel to the space between the flange and rim, and block like bearings between the flange and rim and countersunk in the flange.

2. A disk wheel having a disk terminating in a peripheral flange concentric with the wheel tread, the disk being circumferentially channelled adjacent to the flange to provide an air inlet to the inner side of said flange, a tire carrying rim supported spaced about the flange, said flange being peripherally perforated to admit the air from said channel to the space between the flange and rim, and block like bearings between the flange and rim and countersunk in the flange, the disk being reversely dished between the flange and the center of said disk.

3. A disk wheel having a disk body terminating in a peripheral flange, said body being channelled circumferentially adjacent to said flange, the wall of the channel being slotted, a tire carrying rim about said flange and spaced therefrom, and resilient bearing blocks countersunk at intervals in the flange and forming supports for said rim, said flange being provided with spaced perforations.

In testimony whereof, I have signed my name to this specification this 19th day of August, 1926.

FREDERICK WILLIAM BAKER.

CERTIFICATE OF CORRECTION.

Patent No. 1,820,174.            Granted August 25, 1931, to

FREDERICK WILLIAM BAKER.

It is hereby certified that error appears in the printed specification of the above numbered patent requiring correction as follows: Page 2, line 44, strike out "through the countersunk parts of the cap 23." and insert instead inner wall of the seat 18, while the cap 23; and that the said Letters Patent should be read with this correction therein that the same may conform to the record of the case in the Patent Office.

Signed and sealed this 3rd day of November, A. D. 1931.

M. J. Moore, (Seal)                                  Acting Commissioner of Patents.